US008694672B2

(12) United States Patent
Zheng

(10) Patent No.: US 8,694,672 B2
(45) Date of Patent: *Apr. 8, 2014

(54) METHOD AND SYSTEM FOR TRANSFERRING FILES USING FILE TRANSFER PROTOCOLS FOR PALM OS MOBILE COMPUTER

(75) Inventor: Jianyu Roy Zheng, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 105 days.

This patent is subject to a terminal disclaimer.

(21) Appl. No.: 13/348,889

(22) Filed: Jan. 12, 2012

(65) Prior Publication Data

US 2012/0124158 A1 May 17, 2012

Related U.S. Application Data

(63) Continuation of application No. 12/644,245, filed on Dec. 22, 2009, now Pat. No. 8,166,193, which is a continuation of application No. 10/962,892, filed on Oct. 12, 2004, now Pat. No. 7,673,066.

(60) Provisional application No. 60/518,285, filed on Nov. 7, 2003.

(51) Int. Cl.
*G06F 15/16* (2006.01)

(52) U.S. Cl.
USPC ............................................... 709/232

(58) Field of Classification Search
USPC .......... 709/230, 232, 239, 213, 226; 370/338, 370/465; 713/200, 201; 455/550.1; 715/733; 710/308
See application file for complete search history.

(56) References Cited

U.S. PATENT DOCUMENTS

| 6,130,917 | A  | * | 10/2000 | Monroe ........................ 375/295 |
| 6,292,657 | B1 | * | 9/2001  | Laursen et al. ............... 455/411 |
| 6,356,622 | B1 | * | 3/2002  | Hassell et al. ............... 379/1.01 |
| 6,400,681 | B1 | * | 6/2002  | Bertin et al. ................... 370/218 |
| 6,574,643 | B2 | * | 6/2003  | Walter et al. ........................... 1/1 |

(Continued)

FOREIGN PATENT DOCUMENTS

WO        WO0219653 A2 *  3/2002  ............. H04L 29/11

OTHER PUBLICATIONS

"List of Network Protocols—Definition." Dictionary, Encyclopedia and Thesaurus—WordIQ Dictionary. Web. <http://www.wordiq.com/definition/List of network_protocols>.*

(Continued)

*Primary Examiner* — Imad Hussain
(74) *Attorney, Agent, or Firm* — Sony Corporation

(57) ABSTRACT

A method is disclosed for communicating using a device having a PALM® OS. SMB is used to communicate with a node, and if use of SMB is not possible, FTP is used, and if use of FTP is not possible, BLUETOOTH® is used. If FTP or BLUETOOTH® is selected, file sharing between the device and node that entails a read or write is executed by temporarily copying a file to an internal PALM® OS memory of the device, performing the read or write on the file, and then copying the file back to the node to overwrite a previous version of the file at the node. For non PALM® OS file transfer to the internal memory, the file is wrapped in a PALM® OS stream in the internal memory for executing reads or writes.

17 Claims, 4 Drawing Sheets

(56) References Cited

U.S. PATENT DOCUMENTS

| | | | |
|---|---|---|---|
| 6,594,762 B1* | 7/2003 | Doub et al. | 726/35 |
| 6,971,063 B1* | 11/2005 | Rappaport et al. | 715/733 |
| 7,225,260 B2* | 5/2007 | Herrod | 709/227 |
| 7,231,605 B1* | 6/2007 | Ramakesavan | 715/734 |
| 7,506,064 B1* | 3/2009 | Kruger et al. | 709/239 |
| 7,594,017 B1* | 9/2009 | DiValentino | 709/227 |
| 7,673,066 B2* | 3/2010 | Zheng | 709/232 |
| 7,870,290 B2* | 1/2011 | Kruger et al. | 709/239 |
| 8,037,229 B2* | 10/2011 | Zer et al. | 710/308 |
| 8,166,193 B2* | 4/2012 | Zheng | 709/232 |
| 2001/0055951 A1* | 12/2001 | Slotznick | 455/41 |
| 2002/0022453 A1* | 2/2002 | Balog et al. | 455/41 |
| 2002/0024940 A1* | 2/2002 | Smith | 370/329 |
| 2002/0078154 A1* | 6/2002 | Djennane et al. | 709/205 |
| 2002/0078208 A1* | 6/2002 | Crump et al. | 709/227 |
| 2002/0101831 A1* | 8/2002 | Gutman et al. | 370/316 |
| 2002/0103907 A1* | 8/2002 | Petersen | 709/226 |
| 2002/0163934 A1* | 11/2002 | Moore et al. | 370/465 |
| 2002/0178126 A1* | 11/2002 | Beck et al. | 705/75 |
| 2002/0188728 A1* | 12/2002 | Ballard | 709/227 |
| 2002/0194251 A1* | 12/2002 | Richter et al. | 709/105 |
| 2003/0004623 A1* | 1/2003 | Namaky et al. | 701/29 |
| 2003/0018887 A1* | 1/2003 | Fishman et al. | 713/151 |
| 2003/0087629 A1* | 5/2003 | Juitt et al. | 455/411 |
| 2003/0095524 A1* | 5/2003 | Stephens et al. | 370/338 |
| 2003/0105812 A1* | 6/2003 | Flowers et al. | 709/203 |
| 2003/0139179 A1* | 7/2003 | Fuchs et al. | 455/426 |
| 2003/0191811 A1* | 10/2003 | Hashem et al. | 709/216 |
| 2004/0015720 A1* | 1/2004 | Dubuque | 713/201 |
| 2004/0025047 A1* | 2/2004 | Mayne et al. | 713/200 |
| 2004/0030801 A1* | 2/2004 | Moran et al. | 709/244 |
| 2004/0044776 A1* | 3/2004 | Larkin | 709/228 |
| 2004/0061718 A1* | 4/2004 | Fitzpatrick et al. | 345/758 |
| 2004/0157639 A1* | 8/2004 | Morris et al. | 455/550.1 |
| 2004/0162885 A1* | 8/2004 | Garg et al. | 709/213 |
| 2004/0204029 A1* | 10/2004 | Parry | 455/552.1 |
| 2004/0205207 A1* | 10/2004 | Motoyama | 709/230 |
| 2004/0264498 A1* | 12/2004 | Feuerstraeter et al. | 370/465 |
| 2005/0025117 A1* | 2/2005 | Inagaki et al. | 370/350 |
| 2005/0030375 A1* | 2/2005 | Zangrande et al. | 348/143 |
| 2005/0036509 A1* | 2/2005 | Acharya et al. | 370/466 |
| 2005/0102537 A1* | 5/2005 | Zheng | 713/201 |
| 2006/0015814 A1* | 1/2006 | Rappaport et al. | 715/733 |
| 2006/0030341 A1* | 2/2006 | Pham | 455/462 |
| 2008/0080477 A1* | 4/2008 | Block et al. | 370/351 |
| 2008/0263130 A1* | 10/2008 | Michalowitz et al. | 709/202 |
| 2010/0100638 A1* | 4/2010 | Zheng | 709/232 |
| 2011/0060804 A1* | 3/2011 | Alfke | 709/206 |

OTHER PUBLICATIONS

Hillerson. "Palm® File Format Specification." N.p., pp. 1-112, 2001. <https://urchin.earth.li/darcs/ganesh/gps/Palm_File_Format_Specs.pdf>.*

Winton, Greg. "Palm OS Network Programming: Chapter 5: A Brief Tour of the Net Library." Palm OS Network Programming: Chapter 5: A Brief Tour of the Net Library. N.p., Sep. 2001. pp. 1-18.*

Microsoft. "Common Internet File System." Common Internet File System. pp. 1-3 Jan. 2013. <http://technet.microsoft.com/en-us/library/cc939973>.*

* cited by examiner

FILE SHARING

FILE TRANSFER

METHOD AND SYSTEM FOR TRANSFERRING FILES USING FILE TRANSFER PROTOCOLS FOR PALM OS MOBILE COMPUTER

RELATED APPLICATIONS

This application is a continuation of U.S. application Ser. No. 12/644,245 filed on Dec. 22, 2009, now U.S. Pat. No. 8,166,193, which in turn is a continuation of U.S. application Ser. No. 10/962,892 filed on Oct. 12, 2004, now U.S. Pat. No. 7,673,066, which in turn claims priority from U.S. Provisional Application No. 60/518,285 filed on Nov. 7, 2003.

FIELD OF THE INVENTION

The present invention relates generally to computer file sharing and transfers using mobile computers.

BACKGROUND

Computer files can be transferred between computers using one of a variety of protocols, most of which are intended for use with personal computer operating systems (OS). For example, the generic File Transfer Protocol (FTP) for PCs, which essentially is a top level application program that relies on processing and communication layers in a PC OS, enables files to be transferred with security control to do such things as navigate, create, and delete directories, and to copy and delete files, and so on. A more widely used protocol is the server message block (SMB) protocol, which facilitates even more operations including sharing files, serial ports, and printers. SMB can also provide for two levels of security.

Yet a third protocol for transferring files between devices is BLUETOOTH®, which is intended for wireless environments and which essentially offers the same capabilities as FTP. All of these protocols assume use with a PC OS and require both ends of the transmission (client and server, for instance) to possess communication protocol stacks that match each other.

As understood herein, the above protocols are designed with the PC OS in mind, but that other OS such as PALM® OS are used in smaller wireless devices such as wireless telephones and personal digital assistants (PDA). As further understood herein, the PALM® OS does not have all of the PC OS features that conventional file sharing protocols assume. For example, as recognized herein, the PALM® OS does not have a conventional file system in its internal memory, which is relatively small. Rather, files are stored as databases with header information. Further, network communication support in PALM® OS is confined to the transmission control protocol/Internet protocol (TCP/IP) layer. With the above observations in mind, the present invention has been provided.

SUMMARY OF THE INVENTION

A method for communicating using a device having a PALM® operating system (OS) includes preferentially using server message block (SMB) to communicate with a node, and if use of SMB to communicate with the node is not possible, using file transfer protocol (FTP). If use of FTP is not possible to communicate with the node, BLUETOOTH® is used.

In illustrative embodiments, it a protocol for communication between the device and a communication node has not been identified, it is determined whether the node can communicate using a SMB dialect available to the device, and if so, SMB is selected as the communication protocol. If the node cannot communicate using a SMB dialect available to the device, the node is queried with a FTP message and if an appropriate response is received, FTP is selected as the communication protocol. On the other hand, if an appropriate response is not received, identifications of devices are attempted to be gathered using BLUETOOTH®, and if an identification matches the identification of the node, BLUETOOTH® is selected as the communication protocol.

If SMB or BLUETOOTH® is selected as the protocol, a user name can be automatically set to a default name. In contrast, if FTP or BLUETOOTH® is selected as the protocol, file sharing between the device and node that entails a read or write may be executed by temporarily copying a file to an internal PALM® OS memory of the device, performing the read or write on the file, and then copying the file back to the node to overwrite a previous version of the file at the node. For file transfer to or from the internal memory of the device, the method can include transferring a file that is not in PALM® OS format between the internal memory and the node by wrapping the file in a PALM® OS stream in the internal memory and performing a read or a write on the file. On the other hand, for file transfer to or from an expansion memory of the device, the method can include transferring a file between the expansion memory and the node by byte-to-byte copying of the file using a file allocation table (FAT) of the expansion memory. In this case, the file may be transferred through the internal memory.

In another aspect, a system includes a processor communicating using a protocol stack. The stack can include an application layer having at least two application layer protocols selected from the group including BLUETOOTH®, file transfer protocol (FTP), and server message block (SMB). A protocol layer is on top of the application layer for selecting which application layer protocol to use to communicate with a node.

In still another aspect, a PALM® OS device has an internal memory, an expansion memory, and a PALM® operating system (OS) accessing the memories. Means are provided to the PALM® OS for determining whether the node can communicate using a SMB dialect available to the device, and if so, selecting SMB as the communication protocol. Means are also provided to the PALM® OS for, if the node cannot communicate using a SMB dialect available to the device, querying the node with a FTP message, and if an appropriate response is received, selecting FTP as the communication protocol. Still further, means are provided for, if an appropriate response is not received, gathering identifications of devices using BLUETOOTH®. If an identification matches an identification of the node, BLUETOOTH® is selected.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
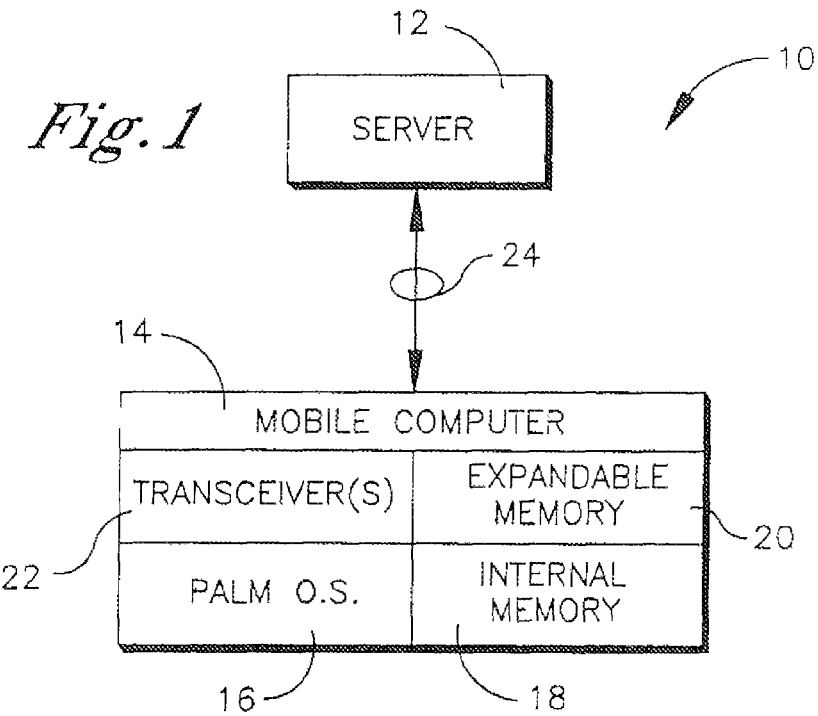
FIG. 1 is a block diagram of the present mobile file transfer protocol (mFTP), shown in one intended environment.

Referring initially to FIG. 1, a system is shown, generally designated 10, that includes one or more servers 12 communicating with one or more mobile computing devices 14. The mobile computing device 14 may be a wireless telephone, personal digital assistant (PDA), or other device that uses a non-personal computer (PC) operating system (OS), and in the embodiment shown that uses a PALM® OS 16. The OS 16 can access an internal memory 18 and an expansion memory 20 that may be implemented by an expansion memory card. The OS 16 also accesses at least two transceivers 22 for purposes to be shortly disclosed for communicating with the server 12 over a wired or wireless link 24. The transceivers 22 can include modems, 802.11 devices, and BLUETOOTH® infrared (IR) and/or radiofrequency (rf) transceivers.

Figure 2:
FIG. 2 is a schematic representation of an exemplary protocol stack of the present mFTP.

FIG. 2 shows one embodiment of the protocol stack 26 of the present invention, which need not be exactly paired in the server 12. The stack 26 can include an application layer that includes a top-most mFTP layer which functions as described herein over a BLUETOOTH® FTP layer, a SMB layer, and a FTP layer. The BLUETOOTH® FTP layer is on top of a conventional Object Exchange protocol (OBEX) presentation, session, network, and transport layer. Under the OBEX layer in turn, can be conventional BLUETOOTH® (radiofrequency) and infrared data link and physical layers.

On the other hand, as shown in FIG. 2 the data link and physical layer for the SMB layer is a conventional IEEE 802.11 layer, whereas the data link and physical layer for the FTP layer is a conventional modem. A conventional PALM® OS TCP/IP stack serves as the network and transport layer for both the SMB layer and FTP layer. However, unlike a conventional PALM® OS architecture in accordance with the present invention a net basic input/output system (NetBIOS) layer is provided as a session layer between the SMB layer and PALM® OS TCP/IP layer. The logic below is implemented by the cooperation between the mFTP layer, BLUETOOTH® FTP layer, SMB layer with NetBIOS layer, and FTP layer.

It is to be understood that the processor of the computer 14 accesses the OS 16 to undertake the logic shown and discussed below, which may be executed by a processor as a series of computer-executable instructions.

The instructions may be contained on a data storage device with a computer readable medium, such as a computer diskette having a computer usable medium with computer readable code elements stored thereon. Or, the instructions may be stored on a DASD array, magnetic tape, conventional hard disk drive, electronic read-only memory, optical storage device, or other appropriate data storage device, such as the internal memory 18. In an illustrative embodiment of the invention, the computer-executable instructions may be lines of compiled C++ compatible code or JAVA®.

Indeed, the flow charts herein illustrate the structure of the logic of the present invention as embodied in computer program software. Those skilled in the art will appreciate that the flow charts illustrate the structures of computer program code elements including lode circuits on an integrated circuit, that function according, to this invention. Manifestly, the invention is practiced in its essential embodiment by a machine component that renders the program code elements in a form that instructs a digital processing apparatus (that is, a computer) to perform a sequence of function acts corresponding to those shown.

Figure 3:
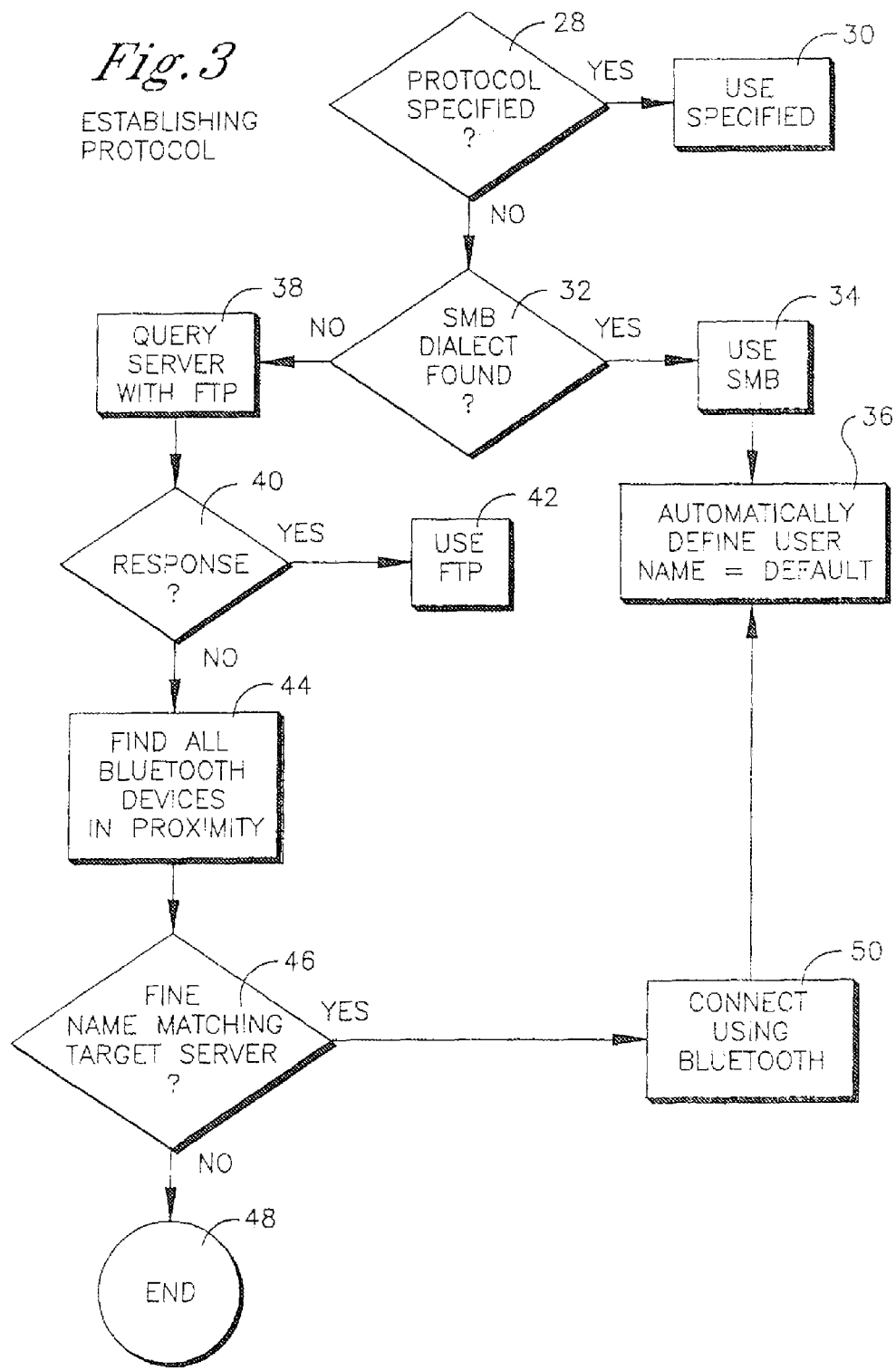
FIG. 3 is a flow chart of the logic of the present mFTP in selecting the protocol.

FIG. 3 illustrates the logic of the present mFTP. It is to be understood that FIG. 3 assumes that a correct user name and password have been input and accepted.

Commencing at decision diamond 28, it is determined whether the desired underlying protocol (SMB, BLUETOOTH®, or FTP) has been specified, e.g., by the user. If it has, the logic flows to block 30 to use the specified protocol. Otherwise, the logic flows to decision diamond 32 to determine whether a suitable SMB dialect can be negotiated with the server. If so, SMB is selected as the protocol at block 34, and the user name is automatically set to the default name at block 36. In contrast, if no SMB dialect can be agreed upon, the logic flows to lock 38 to query the server using FTP, and then at decision diamond 40 it is determined whether a suitable response has been received. If so, the logic selects FTP as the protocol at block 42. Otherwise, all BLUETOOTH® devices in the proximity of the device are located at block 44 using Bluetooth principles known in the art.

At decision diamond 46, it is determined whether any device name that is returned as a result of the previous locating step matches the name of the desired file server with which connection is to be made if not the logic ends at state 48, but otherwise the logic connects to the server using BLUETOOTH® at block 50, and then automatically sets the user name to default at block 36.

Figure 4:
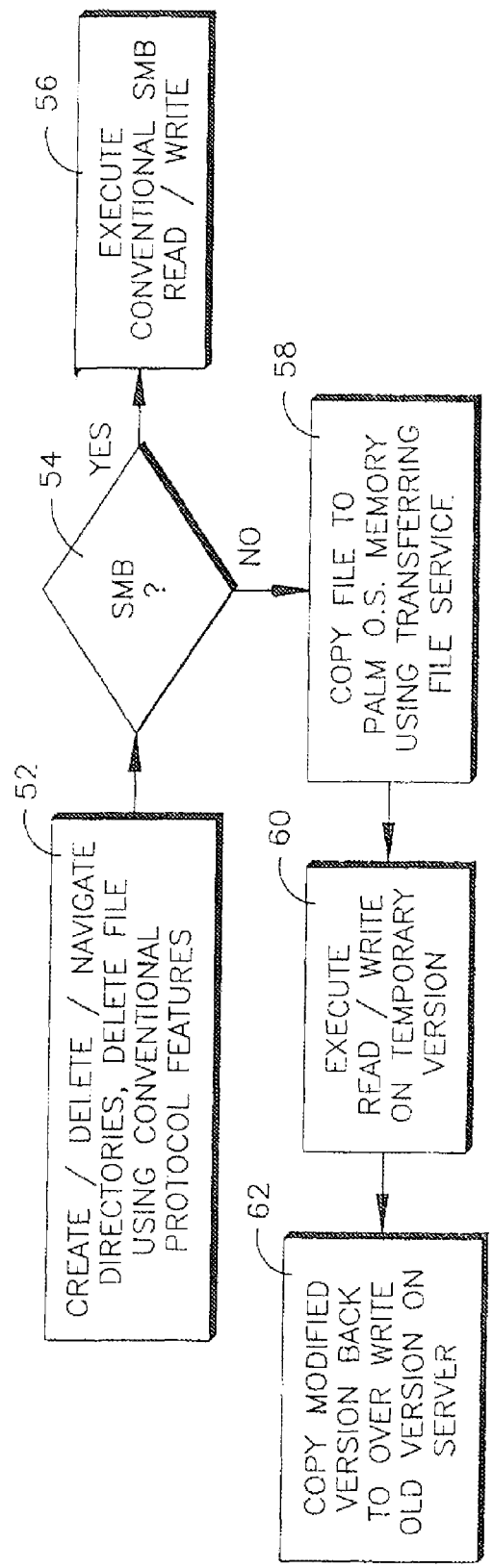
FIG. 4 is a flow chart showing the file sharing logic.

FIG. 4 shows the logic for sharing files between the device and server. Block 52 simply indicates that directories are created, deleted, and navigated and files deleted using the conventional features of the underlying protocol selected as a result of FIG. 3. Decision diamond 54 indicates that if SMB was selected in FIG. 3, reading and writing files may be done conventionally at block 56. However, if FTP or BLUETOOTH® is the selected protocol, the logic proceeds to block 58 to temporarily copy the file to be shared to the local internal PALM® OS memory of the device using the underlying file transfer service. A read (or write, as appropriate) is then executed on the temporary version at block 60, and the result is copied batik to the appropriate location in the server at block 62 to overwrite the version on the remote server. Running a PALM® OS application on the device from the remote server is executed using the read or write file function described above.

Figure 5:
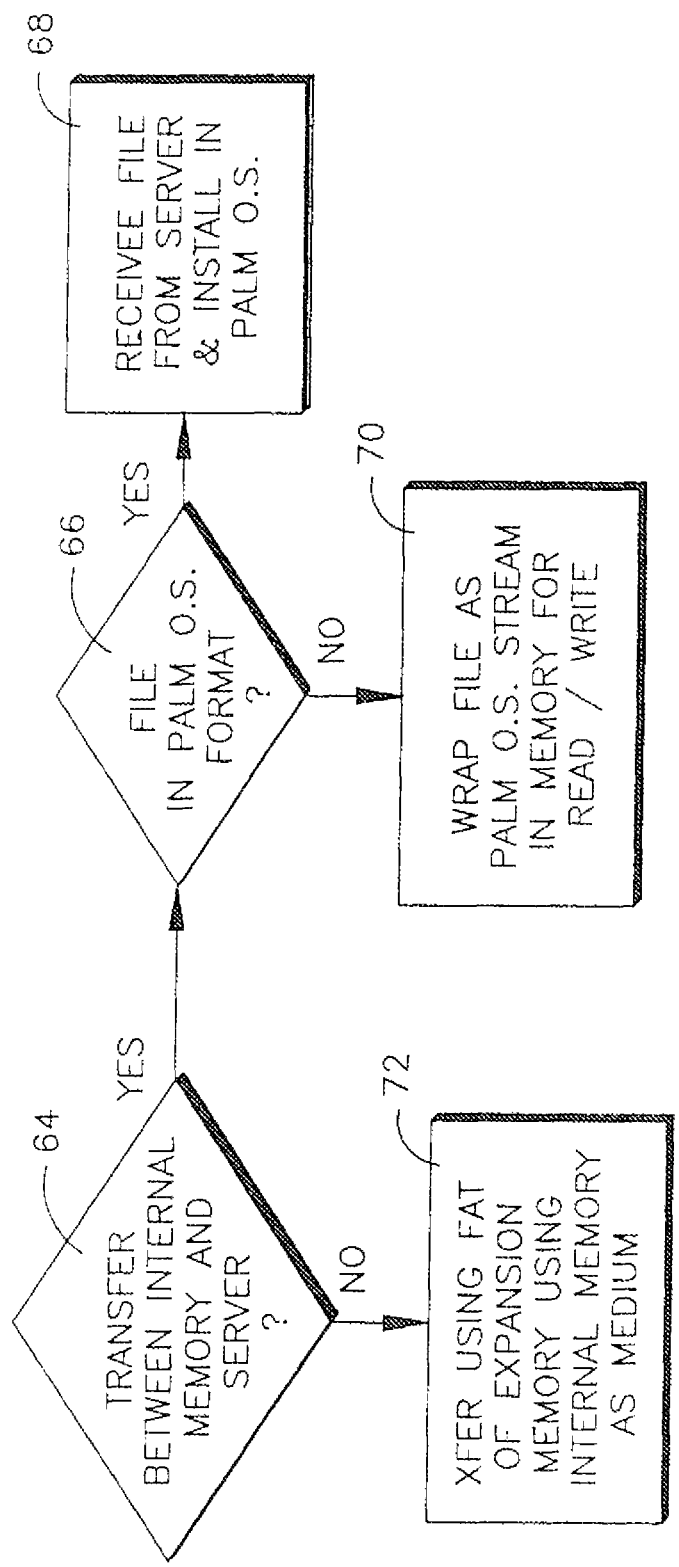
FIG. 5 is a flow chart showing the file transfer logic.

FIG. 5 shows the file transfer logic. Decision diamond 64 represents a branch in the logic depending on whether the file is to be transferred between the server 12 and the local internal PALM® OS memory 18 or between the server and the expansion PALM® OS memory 20. In the former case, the logic flows 10 decision diamond 66 to determine whether the file in question is in PALM® OS format, and if it is the logic moves to block 68 to receive the file from the server (for a read) or transfer the file to the server (for a write) using PALM® OS principles known in the art. If the file is not in OS format, however, the logic proceeds to block 70 to wrap the file in a PALM® OS stream in the internal memory of the PALM® OS so that the file can be read or written but not necessarily be directly accessible to an end user of the device.

If the file is to be transferred to or from the expansion memory 20, which is expected to employ a conventional file allocation table (FAT), the logic moves from decision diamond 64 to block 72 to transfer the file using the FAT in a byte-to-byte copy, using the PALM® OS native internal memory as a transmission medium.

While the particular FILE TRANSFER PROTOCOL FOR MOBILE COMPUTER as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. A method for communicating using a mobile communication device, the method comprising:
   in the mobile communication device:
   communicating with a node using server message block (SMB) communication protocol;
   communicating with the node using file transfer protocol (FTP), if use of SMB communication protocol to communicate with the node is not possible;
   communicating with the node using BLUETOOTH® communication protocol, if use of FTP and SMB to communicate with the node is not possible, wherein the mobile communication device operates using a first operating system (OS); and
   receiving at least one file in a second OS format from the node, wherein receiving the file comprises:
   storing the file in at least one internal memory of the mobile communication device, and
   wrapping the file in a first OS stream in the at least one internal memory,
   wherein the first OS is different from the second OS and wherein the first OS has a subset of capabilities of the second OS.

2. The method of claim 1, wherein if a protocol for communication between the mobile communication device and the node has not been identified, determining whether the node can communicate using a SMB communication protocol dialect available to the mobile communication device, and if so, selecting SMB communication protocol to communicate with the node.

3. The method of claim 2, wherein if the node cannot communicate using the SMB communication protocol dialect available to the mobile communication device, the node is queried with an FTP message and if an FTP associated response is received, FTP is selected to communicate with the node.

4. The method of claim 3, wherein if the FTP associated response is not received, identifications of devices are attempted to be gathered using BLUETOOTH® communication protocol, and if an identification matches an identification of the node, BLUETOOTH® communication protocol is selected to communicate with the node.

5. The method of claim 1, wherein if SMB communication protocol or BLUETOOTH® communication protocol is selected for communication with the node, a user name is automatically set to a default name.

6. The method of claim 1, wherein if FTP or BLUETOOTH® communication protocol is selected, file sharing between the mobile communication device and the node that entails a read or write is executed by temporarily copying a file to the at least one internal memory of the mobile communication device, performing the read or write on the file, and then copying the file back to the node to overwrite a previous version of the file at the node.

7. The method of claim 1, further comprising transferring at least one file between an expansion first OS memory of the mobile communication device and the node by byte-to-byte copying of the file using a file allocation table (FAT) of the expansion first OS memory, wherein the file being transferred through the at least one internal memory of the mobile communication device.

8. The method of claim 1, wherein the first OS comprises a PALM® OS.

9. A system, comprising:
   at least one processor, wherein the processor operates using a first operating system (OS);
   at least one internal memory; and
   a protocol stack communicating with the processor, wherein the protocol stack comprises:
   an application layer having at least two application layer protocols selected from a group comprising BLUETOOTH® communication protocol, file transfer protocol (FTP), and server message block (SMB) communication protocol; and
   a protocol selection layer on top of the application layer for selecting which application layer protocol to use to communicate with a node, wherein the protocol selection layer uses SMB communication protocol to communicate with the node, and if use of SMB communication protocol to communicate with the node is not possible, use FTP or BLUETOOTH® communication protocol, and wherein the processor receives at least one file in a second OS format from the node by:
   storing the file in the at least one internal memory, and
   wrapping the file in a first OS stream in the at least one internal memory,
   wherein the first OS is different from the second OS and wherein the first OS has a subset of capabilities of the second OS.

10. The system of claim 9, wherein the application layer has all three application layer protocols.

11. The system of claim 9, further comprising a PALM® OS transport control protocol/internet protocol (TCP/IP) layer and a session layer, wherein session layer is in between the PALM® OS TCP/IP layer and a layer associated with the SMB communication protocol, wherein the session layer comprises a net basic input/output system (NetBIOS) layer and wherein the first OS comprises a PALM® (OS).

12. The system of claim 9, wherein if FTP or BLUETOOTH® communication protocol is selected, the first OS executes file sharing with the node that entails a read or write by temporarily copying a file to the at least one internal memory, performing the read or write on the file, and then copying the file back to the node to overwrite a previous version of the file at the node.

13. The system of claim 9, further comprising an expansion first OS memory, wherein the first OS transfers at least one file between the expansion first OS memory and the node by byte-to-byte copying of the file using a file allocation table (FAT) of the expansion first OS memory, the file being transferred through the at least one internal memory.

14. A mobile communication device, comprising:
   at least one internal memory;
   at least one expansion memory; and
   one or more processors operable to:

determine whether a node can communicate using a server message block (SMB) communication protocol dialect available to the mobile communication device;

select SMB communication protocol, if SMB communication protocol for communication between the mobile communication device and the node is possible;

query the node with an FTP message, if the node cannot communicate using the SMB communication protocol dialect available to the mobile communication device;

select FTP, if an FTP associated response is received;

gather identifications of devices using BLUETOOTH® communication protocol, if the FTP associated response is not received;

select BLUETOOTH® communication protocol, if an identification matches an identification of the node, wherein the mobile communication device operates using a first operating system (OS); and receive at least one file in a second OS format from the node, wherein receiving the at least one file comprises:
   store the file in the at least one internal memory, and
   wrap the file in a first OS stream in the at least one internal memory, wherein the first OS is different from the second OS and wherein the first OS has a subset of capabilities of the second OS.

15. The mobile communication device of claim 14, wherein if SMB communication protocol or BLUETOOTH® communication protocol is selected the one or more processors are operable to automatically set a user name to a default name.

16. The mobile communication device of claim 14, wherein if FTP or BLUETOOTH® communication protocol is selected, file sharing between the mobile communication device and the node that entails a read or write is executed by temporarily copying a file to the at least one internal memory of the mobile communication device, performing the read or write on the file, and then copying the file back to the node to overwrite a previous version of the file at the node.

17. The mobile communication device of claim 14, wherein the one or more processors are operable to transfer at least one file between the at least one expansion memory and the node by byte-to-byte copying of the file using a file allocation table (FAT) of the at least one expansion memory, wherein the file is transferred through the at least one internal memory of the mobile communication device.

* * * * *